L. WENZEL.
SLIDE MICROMETER.
APPLICATION FILED JAN. 23, 1917.
1,230,249.
Patented June 19, 1917.
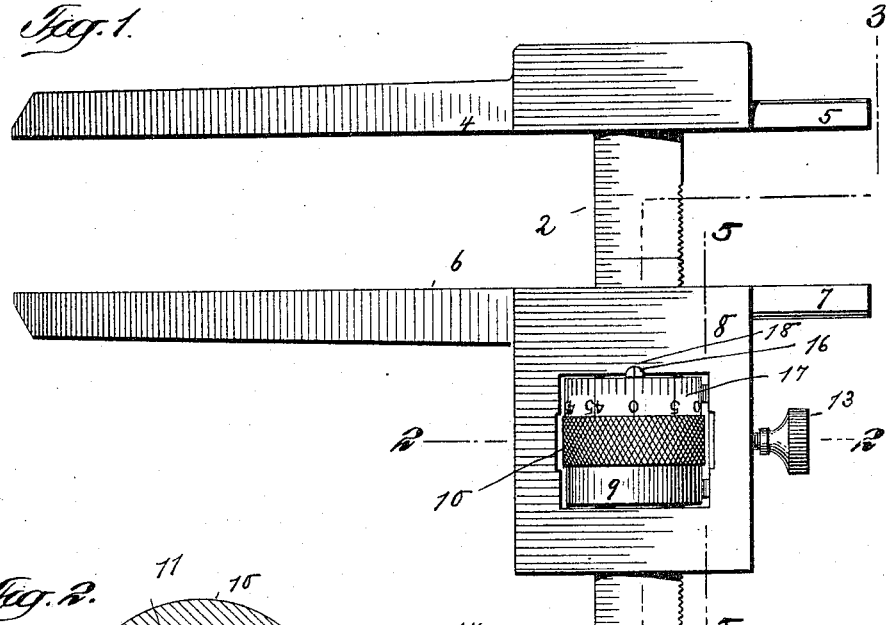
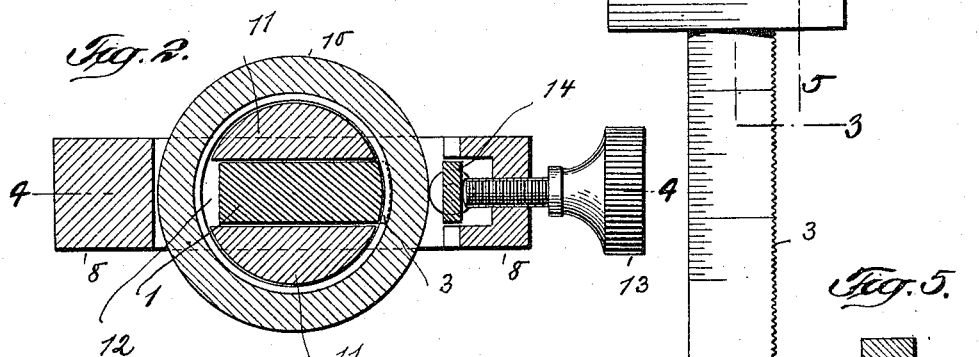
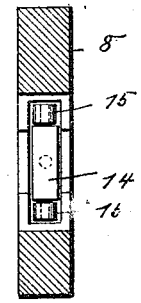
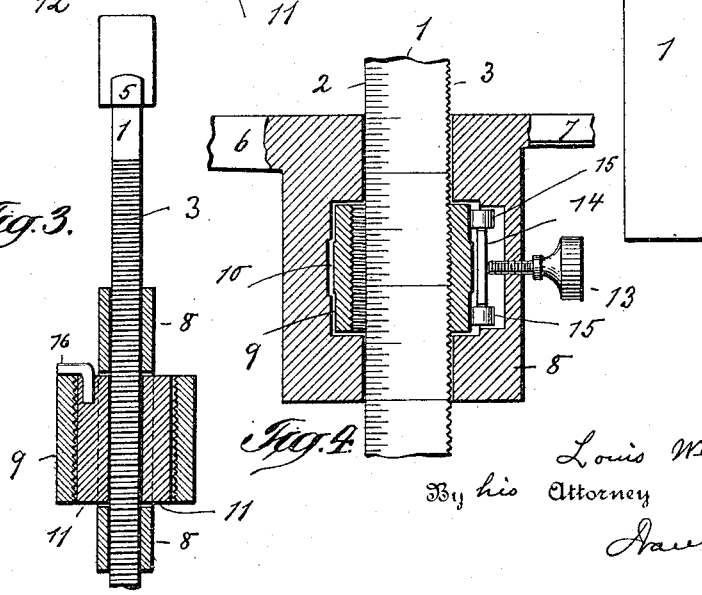
Inventor
Louis Wenzel
By his Attorney

UNITED STATES PATENT OFFICE.

LOUIS WENZEL, OF ELIZABETH, NEW JERSEY.

SLIDE-MICROMETER.

1,230,249.

Specification of Letters Patent.

Patented June 19, 1917.

Application filed January 23, 1917. Serial No. 143,889.

*To all whom it may concern:*

Be it known that I, LOUIS WENZEL, a citizen of the United States, and a resident of Elizabeth, in the county of Union and State of New Jersey, have invented certain new and useful Improvements in Slide-Micrometers, of which the following is a specification.

This invention relates to a slide micrometer of novel construction which may be set with great accuracy say to the thousandth part of an inch. The construction is such, that after a rough adjustment has been first given to the micrometer by moving a slide manually along the beam, a fine adjustment may subsequently be imparted, by causing said slide to be advanced through the rotation of a nut that engages the beam and is housed within the slide. The invention comprises the various features of novelty more fully pointed out in the specification and appended claims.

In the accompanying drawing:

Figure 1 is a side elevation of a slide micrometer embodying my invention;

Fig. 2, a section on line 2—2 Fig. 1;

Fig. 3, a section on line 3—3 Fig. 1;

Fig. 4, a section on line 4—4 Fig. 2, and

Fig. 5, a section on line 5—5 Fig. 1.

The device comprises essentially, a beam 1, having graduations 2 along its front edge, and teeth 3 along its back to constitute a rack. The fixed jaw 4 of the micrometer having a projection 5 for internal measurements is mounted on the end of beam 1. The movable jaw 6 having a corresponding projection 7, is carried by a slide 8, that encompasses beam 1 and is movable along the same. Slide 8 is provided with a squared opening within which is accommodated a cylindrical nut 9 having a slightly raised and knurled central section 10 by which the nut may be turned. Nut 9 encircles beam 1, and likewise a pair of cores or non-rotatable members 11, of segmental cross-section that are placed against the two opposite flat sides of the beam. These cores are likewise received within the opening of slide 8, and their length corresponds to that of nut 9, the nut as well as the cores abutting against the right and left walls of the opening, so that they will be taken along by the slide, as the latter is set along the beam. The diameter of the bore of nut 9 is somewhat larger than the width of beam 1, thus providing a clearance 12, which permits the nut to be set transversely to the beam, in such a manner that the threaded eye of the nut may be thrown either into or out of engagement with the teeth 3 of the beam. In order to effect this result, there is tapped into that side of slide 8 which faces teeth 3, a set screw 13, that bears upon a gib 14 housed within a recess of the slide. This gib is furnished at its ends with gudgeons carrying friction rollers 15, that are adapted to engage nut 9, to the right and left of its raised annulus 10. Thus when set screw 13 is advanced, it will so shift nut 9, that its thread will be thrown into engagement with the teeth of beam 1 (Fig. 4), while when the set screw is retracted, the nut may be manually shifted to clear such teeth, the width of the opening in slide 8, being such as to permit the lateral displacement of the nut.

From the end of one of the cores 11, there extends forwardly, a post or pointer 16, the upper end of which is flush with one of the ends of nut 9. This end is provided with a scale 17 arranged in a circle and adapted to coöperate with a scratch or mark 18, formed at the end of post 16.

In use, set screw 13 is relaxed, nut 9 is lifted out of engagement with teeth 3 and slide 8 is moved along beam 1, until its edge registers with that mark on scale 2 which is nearest to the measurement desired. Nut 9 is set to its zero mark, and set screw 13 is advanced to push the nut into engagement with the rack, and simultaneously draw the slide tightly against the graduated edge of the beam. If now, a finer adjustment of the slide toward or away from the mark on scale 2, is to be effected, screw 13 is slightly eased, and nut 9 is turned until the proper subdivision appears on its scale 17 opposite mark 18, after which the set screw is again tightened up.

This turning of the nut will cause a corresponding minute longitudinal movement of slide 8 along beam 1, the correlation of the parts being preferably such, that a complete rotation of the nut will advance the slide through a single grade on scale 2. Thus when scale 17 is divided into say 50 units, the turning of the nut through one of said units will advance the slide through one fiftieth of the length of one grade on scale 2, so that in this way, an exceedingly delicate adjustment of the micrometer may be effected.

I claim:

1. A slide micrometer comprising a graduated toothed beam, a slide movable along the same, a non-rotatable member flanking the beam, a pointer on said member, a transversely movable nut carried by the slide and encompassing said beam and non-rotatable member, said nut being graduated opposite the pointer, and means for throwing said nut into operative engagement with said beam.

2. A slide micrometer comprising a graduated toothed beam, a slide movable along the same, a pair of cores flanking the beam, a post carried by one of said cores, a transversely movable nut carried by the slide and encompassing said beam and cores, said nut being graduated opposite the post, and means for throwing said nut into operative engagement with said beam.

LOUIS WENZEL.

Copies of this patent may be obtained for five cents each, by addressing the "Commissioner of Patents, Washington, D. C."